(12) United States Patent
Safari

(10) Patent No.: US 12,504,645 B2
(45) Date of Patent: Dec. 23, 2025

(54) HOLOGRAPHIC DISPLAY

(71) Applicant: Robert Safari, Seal Beach, CA (US)

(72) Inventor: Robert Safari, Seal Beach, CA (US)

( * ) Notice: Subject to any disclaimer, the term of this patent is extended or adjusted under 35 U.S.C. 154(b) by 525 days.

(21) Appl. No.: 18/060,699

(22) Filed: Dec. 1, 2022

(65) Prior Publication Data

US 2023/0168520 A1 Jun. 1, 2023

Related U.S. Application Data

(60) Provisional application No. 63/264,710, filed on Dec. 1, 2021.

(51) Int. Cl.
*G02B 30/40* (2020.01)

(52) U.S. Cl.
CPC .................... *G02B 30/40* (2020.01)

(58) Field of Classification Search
CPC ........................................ G02B 30/40
See application file for complete search history.

(56) References Cited

U.S. PATENT DOCUMENTS

| 10,386,789 B2 | 8/2019 | Shi | |
| 10,969,605 B1 * | 4/2021 | Evans | G02B 30/54 |
| 2021/0200151 A1 * | 7/2021 | Bae | G02B 5/045 |

* cited by examiner

*Primary Examiner* — Mariam Qureshi
(74) *Attorney, Agent, or Firm* — NetLawyers LLP; Benedict O'Mahoney

(57) ABSTRACT

The present invention discloses a display for projecting images with the appearance of three dimensions. The display comprises a display housing, which includes a semi-circular window, and a display projection system which includes a media input device and a display monitor. The display monitor can be covered in a two-way film, and the window can be tinted, such that when images are transmitted to the display monitor through the media input device, that media images are reflected against the tinted window and appear to be floating in the semicylindrial space circumscribed by the window and display housing, which appears as a cylindrical space to an observer.

8 Claims, 14 Drawing Sheets

HOLOGRAPHIC DISPLAY

CROSS-REFERENCE TO RELATED APPLICATIONS

The present application claims the benefit of U.S. Provisional Application No. 63/264,710 filed Dec. 1, 2021, by Robert Safari and titled "Holographic Display", which is included by reference herein and for which benefit of the priority date is hereby claimed.

FEDERALLY SPONSORED RESEARCH

Not applicable.

SEQUENCE LISTING OR PROGRAM

Not applicable.

FIELD OF INVENTION

The embodiments described herein are related to the apparent three dimensional display of media.

BACKGROUND OF THE INVENTION

With the continuous development of display technology, a hologram display technology has become a branch of the display technology. The hologram display technology has attracted more and more attention due to the fact that the hologram display technology can provide all information that can satisfy the requirements of human visual sense, and a user can observe the information displayed by the hologram display technology without an auxiliary device such as a helmet, an eyewear, or the like.

SUMMARY OF THE INVENTION

A device for displaying images with the appearance of three dimensions is described herein.

In one embodiment of the present invention, the holographic display comprises a display housing and a display projection system. In one embodiment of the present invention, the display housing comprises a cap, two side rails, a base, a central panel, and a window. In one embodiment of the present invention, the window is tinted. In one embodiment of the present invention, the display projection system comprises a display monitor and a computer processing unit. In one embodiment of the present invention, the display monitor is coated in a two way mirror film. In one embodiment of the present invention, the display projection system further comprises a main switch, breaker switch box, digital to analog converter, LED, fan, amplifier, speaker, temperature sensor, camera and display opt out.

The base is semicircular in shape. The base may contain base lights within it, and may contain a base design on the base top cover. The base design may be cut out of the base top cover so that light from the base lights illuminate the base design. The base lights can be LEDs. In an embodiment, the top base cover is made of a clear material with a design applied thereon, so that the base lights can illuminate the space around the base design. In one embodiment, the clear material made of acylic. The bottom of the base may have castors mounted thereon to make the hologram display easy to move.

The central panel is mounted on top of the base and provides support for a display monitor which is mounted thereon. In one embodiment of the present invention, the display monitor is a 65" OLED television. In other embodiments, the display is utilizes plasma, LED or QLED technology. The central panel may be constructed of any sturdy material, including wood, plastic or metal. The display monitor is mounted on the panel and is configured so that the display is flushly abutted to the base. The display is entirely covered with a two way mirror film. In an embodiment, the two way mirror film is 80% reflective. In one embodiment, the two way mirror film is affixed by applying soap and water to the film and squeezing out any air bubbles with a squeegee.

The cap is mounted on top of the central panel, and is approximately the same semicircular shape as the base. In one embodiment, fans are mounted in the cap and circulate air within the enclosed semicylinder space circumscribed by the window, cap, base and central panel.

The window encloses the vertical space between the base and the cap and the horizontal space between the two side of the central panel, cicumscribing a semicylindrical space. In an embodiment, the window is made from a formable plastic, plexiglass or film. In an embodiment, the window is form factored with heat. In an embodiment, the window is thin enough to be bent into the semicircular shape. Tint is applied to the window to make it reflective. In an embodiment, the tint is two way. In an embodiment, the tint is 95% dark. In an embodiment, the tint is between 60% and 95% dark. In an embodiment, a clear vinyl wrap is applied to protect the window. In an embodiment, a clear automotive clear bra protective coat is applied to protect the window.

A media input device is connected to the display. In an embodiment, the media input device is a computer processing unit. In an embodiment, the media input device is integrated into the display, and can received media input through a Wifi connection, blue tooth device, USB drive, or any other method of delivering media input.

With this configuration, when the base is illuminated with the base lights, the base design shows through the semicircular base top cover, and is reflected in the two way mirror film affixed to the display, so the base top cover appears to be circular to an observer. When a media image is transmitted to the display through the media input device, that media image is reflected against the tinted window and appears to be floating in the semicylindrial space circumscribed by the window, cap, base and central panel which appears as a cylindrical space to an observer.

These and other features, aspects, and embodiments are described below in the section entitled "Detailed Description."

BRIEF DESCRIPTION OF THE DRAWINGS

A complete understanding of the present invention may be obtained by reference to the accompanying drawings, when considered in conjunction with the subsequent, detailed description, in which:

FIG. 7 5 is a side view of the display.

DETAILED DESCRIPTION

Before the invention is described in further detail, it is to be understood that the invention is not limited to the particular embodiments described, as such may, of course, vary. It is also to be understood that the terminology used herein is for the purpose of describing particular embodiments only, and not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed with the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a", "an", and "the" include plural referents unless the context clearly dictates otherwise.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, if dates of publication are provided, they may be different from the actual publication dates and may need to be confirmed independently.

Figure 1:
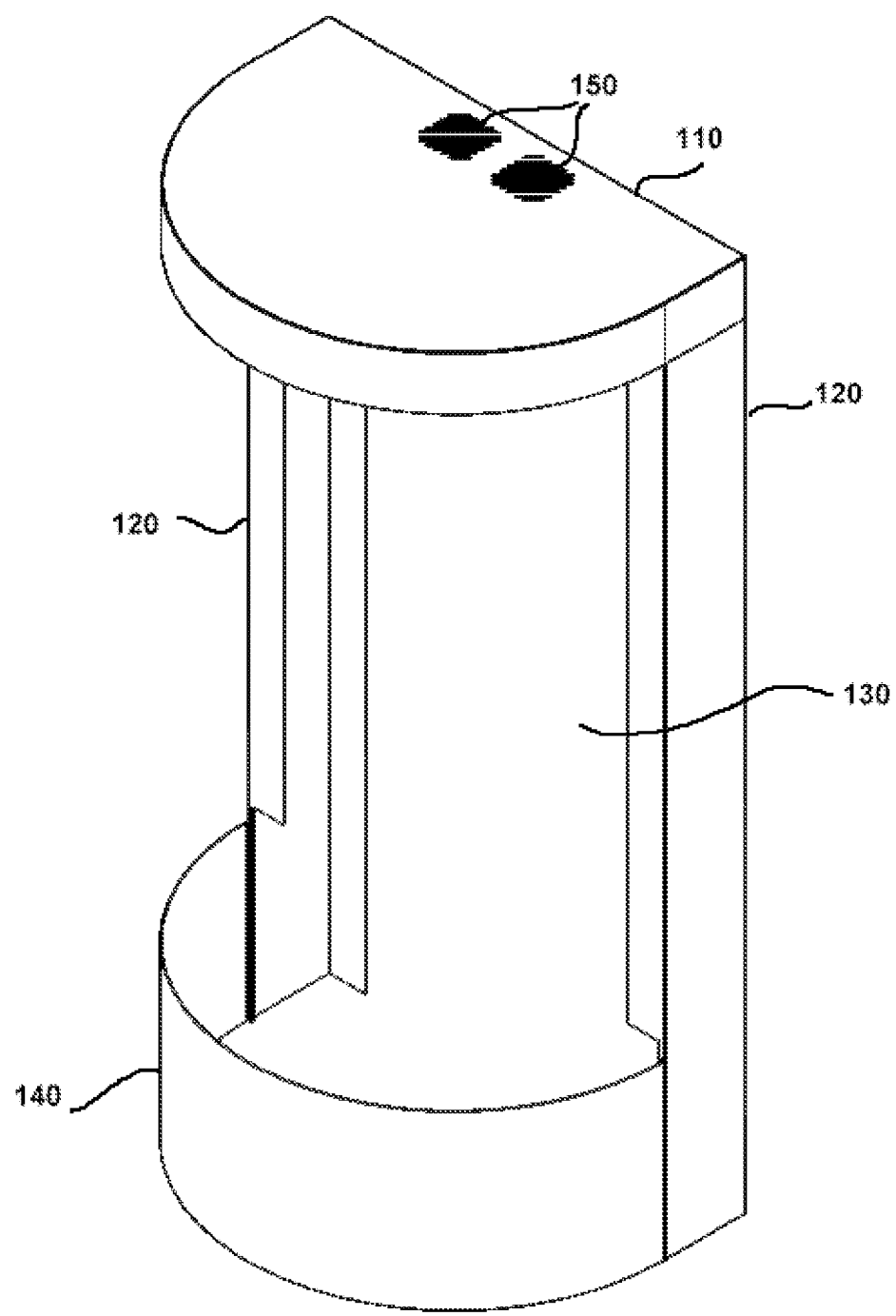
FIG. 1 is an isomorphic view of the display.

FIG. 1 is an isomorphic view of the display. The display shows a display housing comprising a cap 110 which is supported by two side rails 120 and connected to a base 140. At the rear of the display, the side panels 120 further support the central panel 130. Additionally, the cap 100 has two fans 150 to facilitate cooling the interior of the display.

Figure 2:
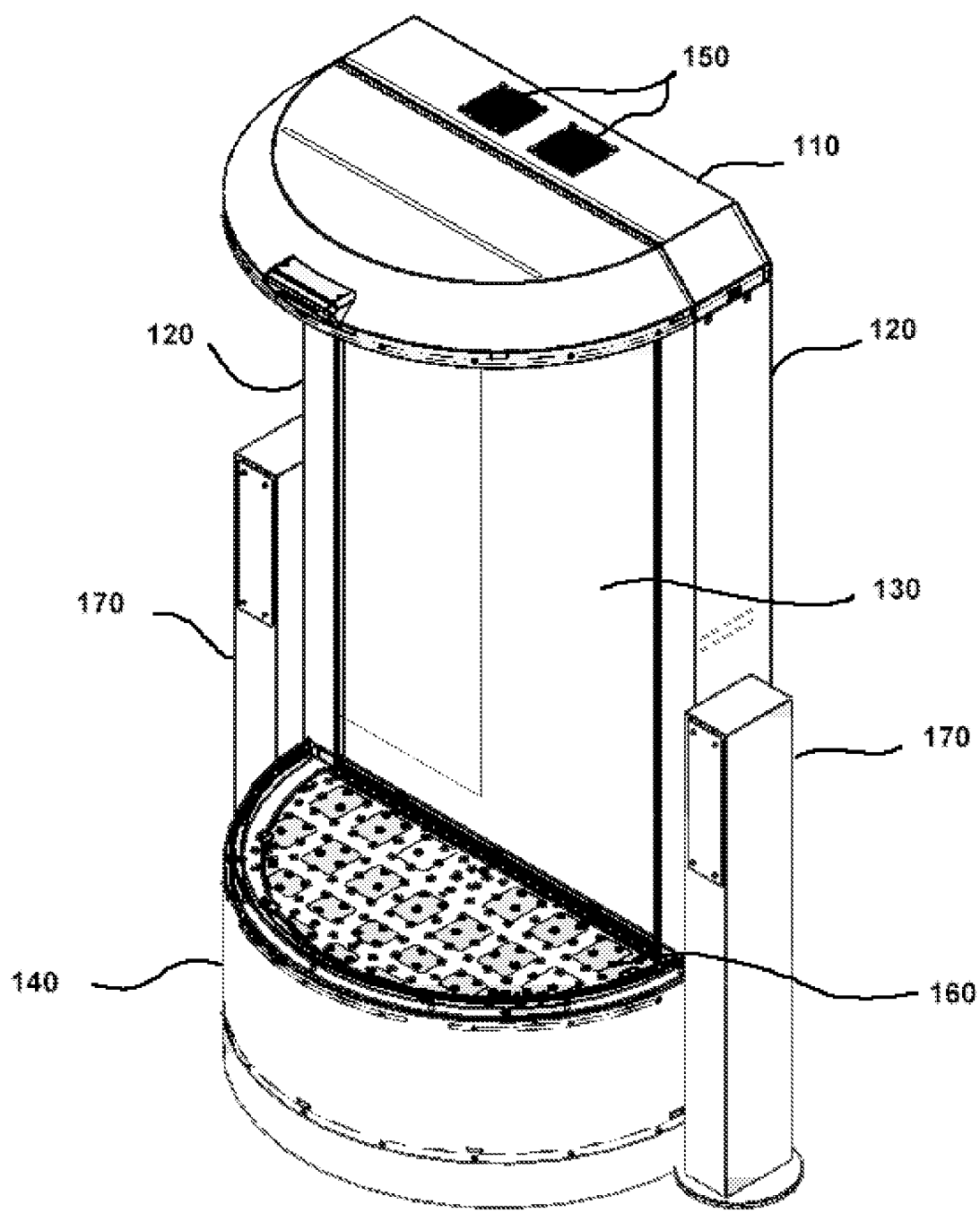
FIG. 2 is an isomorphic view of an alternate display.

FIG. 2 is an isomorphic view of an alternate display. The display shows a display housing comprising a cap 110 which is supported by two side rails 120 and connected to a base 140, which includes a base cover 160 at the top of the base 140. The side rails 120 are further support by two stanchions 170. At the rear of the display, the side panels 120 further support the central panel 130. Additionally, the cap 100 has two fans 150 to facilitate cooling the interior of the display. The base 140 is semicircular in shape. The base 140 may contain base lights within it, and may contain a base design on the base cover 160. The base design may be cut out of the base cover 160 so that light from the base lights illuminate the base design. The base lights can be LEDs. In an embodiment, the base cover 160 is made of a clear material with a design applied thereon, so that the base lights can illuminate the space around the base design. In one embodiment, the clear material made of acylic.

Figure 3:
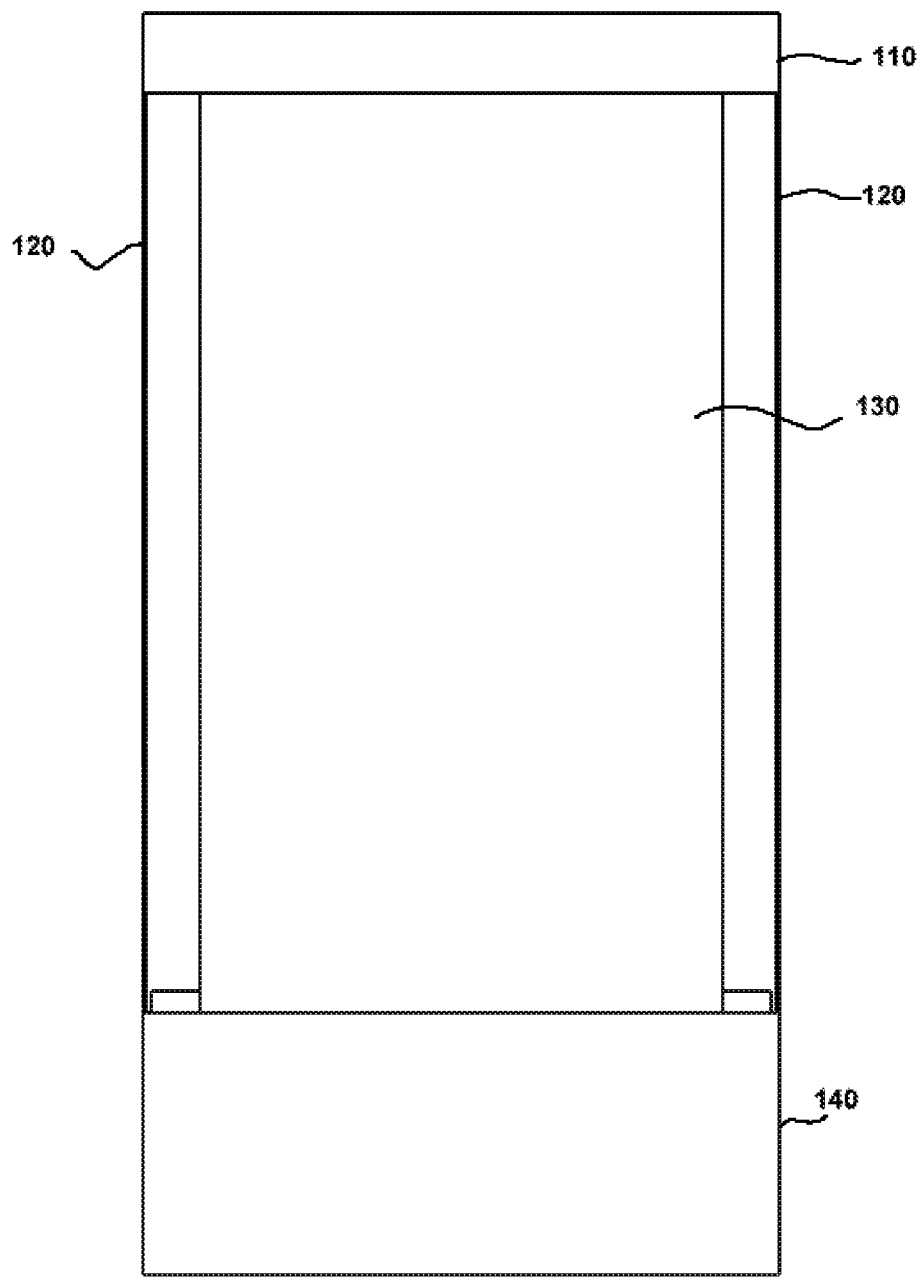
FIG. 3 is a front view of the display.

FIG. 3 is a front view of the display. The display shows a cap 110 which is supported by two side rails 120 and connected to a base 140. At the rear of the display, the side panels 120 further support the central panel 130. The central panel 130 is mounted on top of the base 140 and provides support for a display monitor which is mounted thereon. In one embodiment of the present invention, the display monitor is a 65" OLED television. In other embodiments, the display is utilizes plasma, LED or QLED technology. The central panel 130 may be constructed of any sturdy material, including wood, plastic or metal. The display monitor is mounted on the central panel 130 and is configured so that the display is flushly abutted to the base 140. The display is entirely covered with a two way mirror film. In an embodiment, the two way mirror film is 80% reflective. In one embodiment, the two way mirror film is affixed by applying soap and water to the film and squeezing out any air bubbles with a squeegee.

Figure 4:
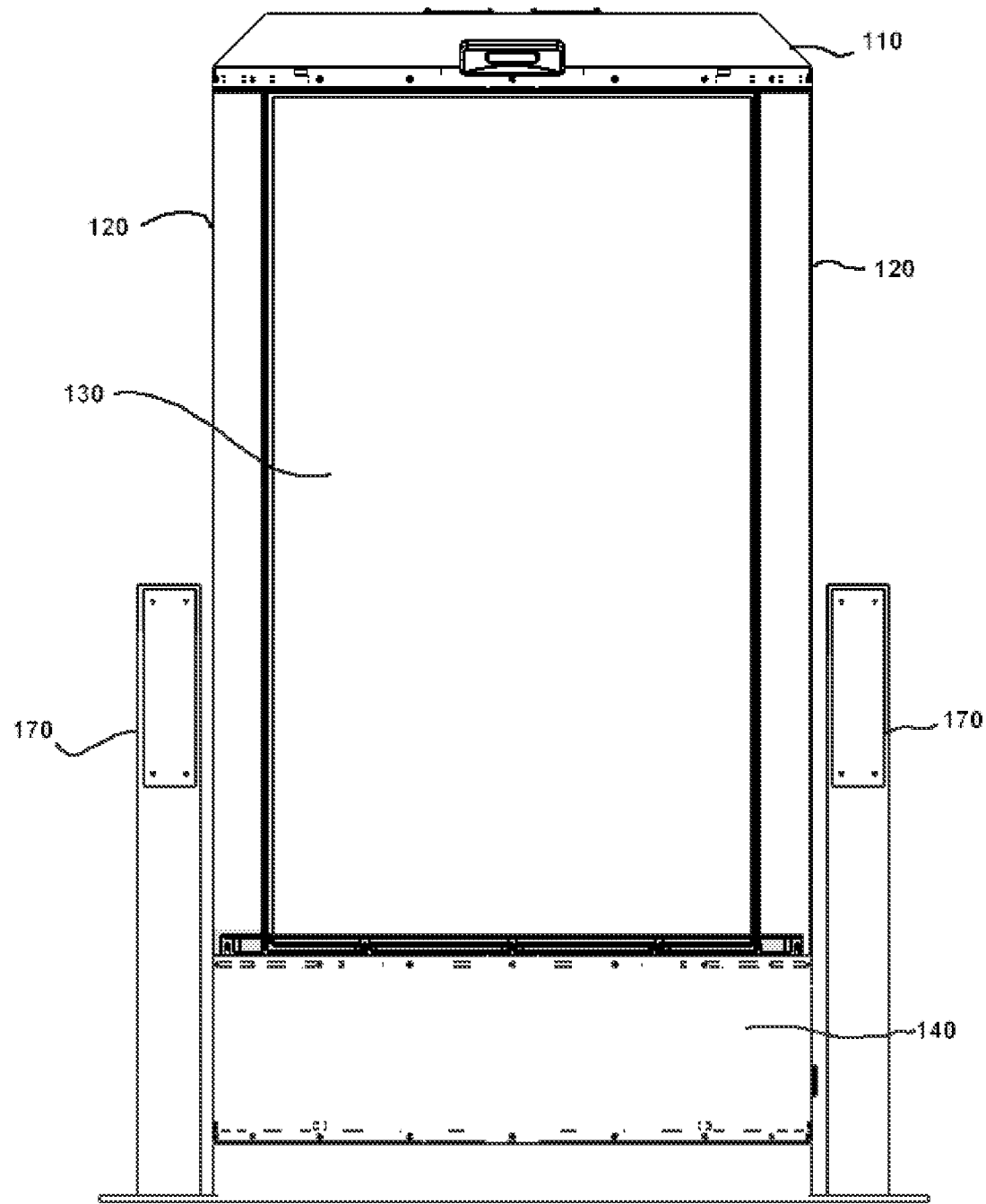
FIG. 4 is front view of an alternate display.

FIG. 4 is front view of an alternate display. The display shows a cap 110 which is supported by two side rails 120 and connected to a base 140. The side rails 120 are further support by two stanchions 170. At the rear of the display, the side panels 120 further support the central panel 130.

Figure 5:
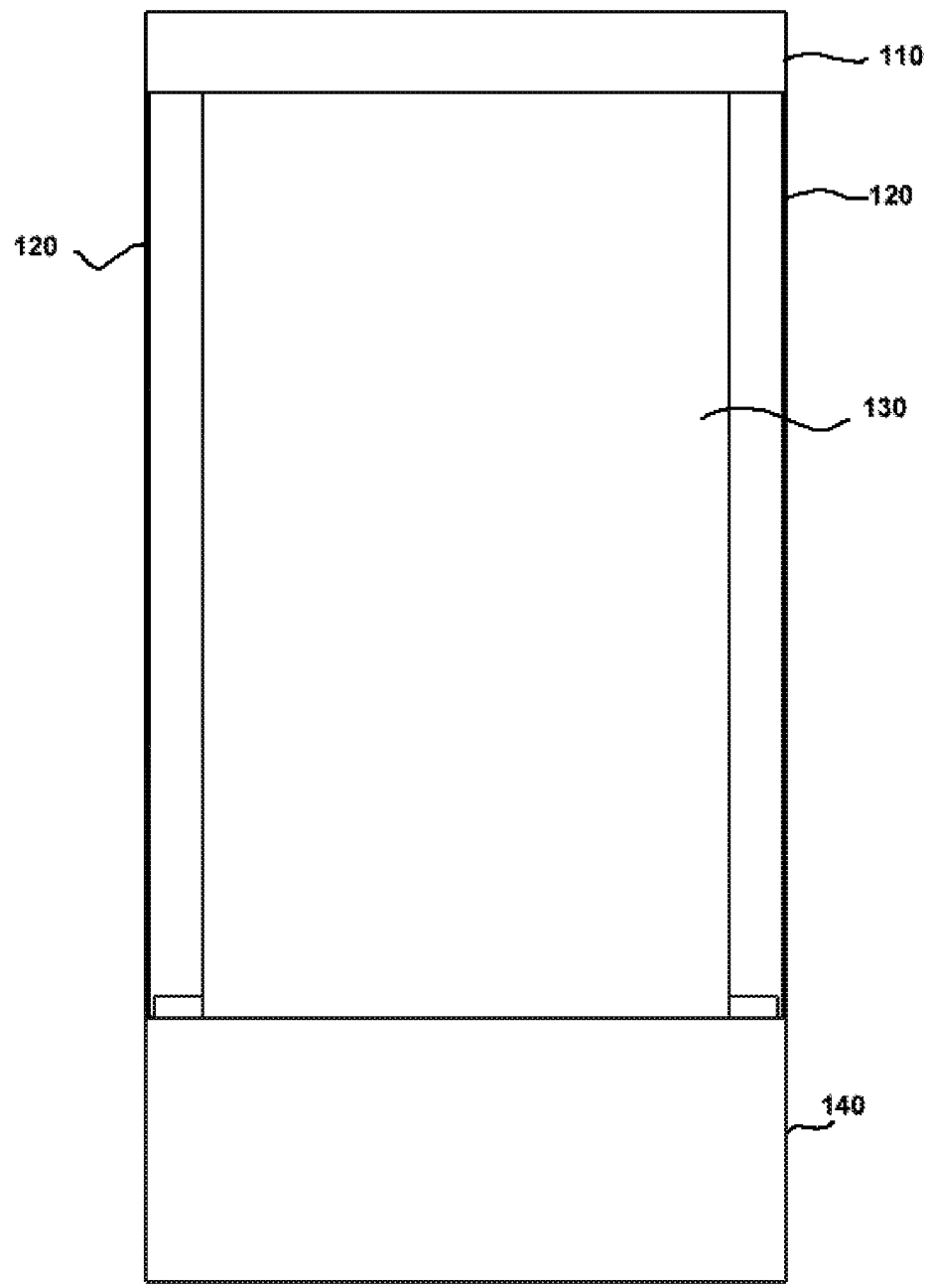
FIG. 5 is a rear view of the display.

FIG. 5 is a rear view of the display. The display shows a cap 110 which is supported by two side rails 120 and connected to a base 140. At the rear of the display, the side panels 120 further support the central panel 130.

Figure 6:
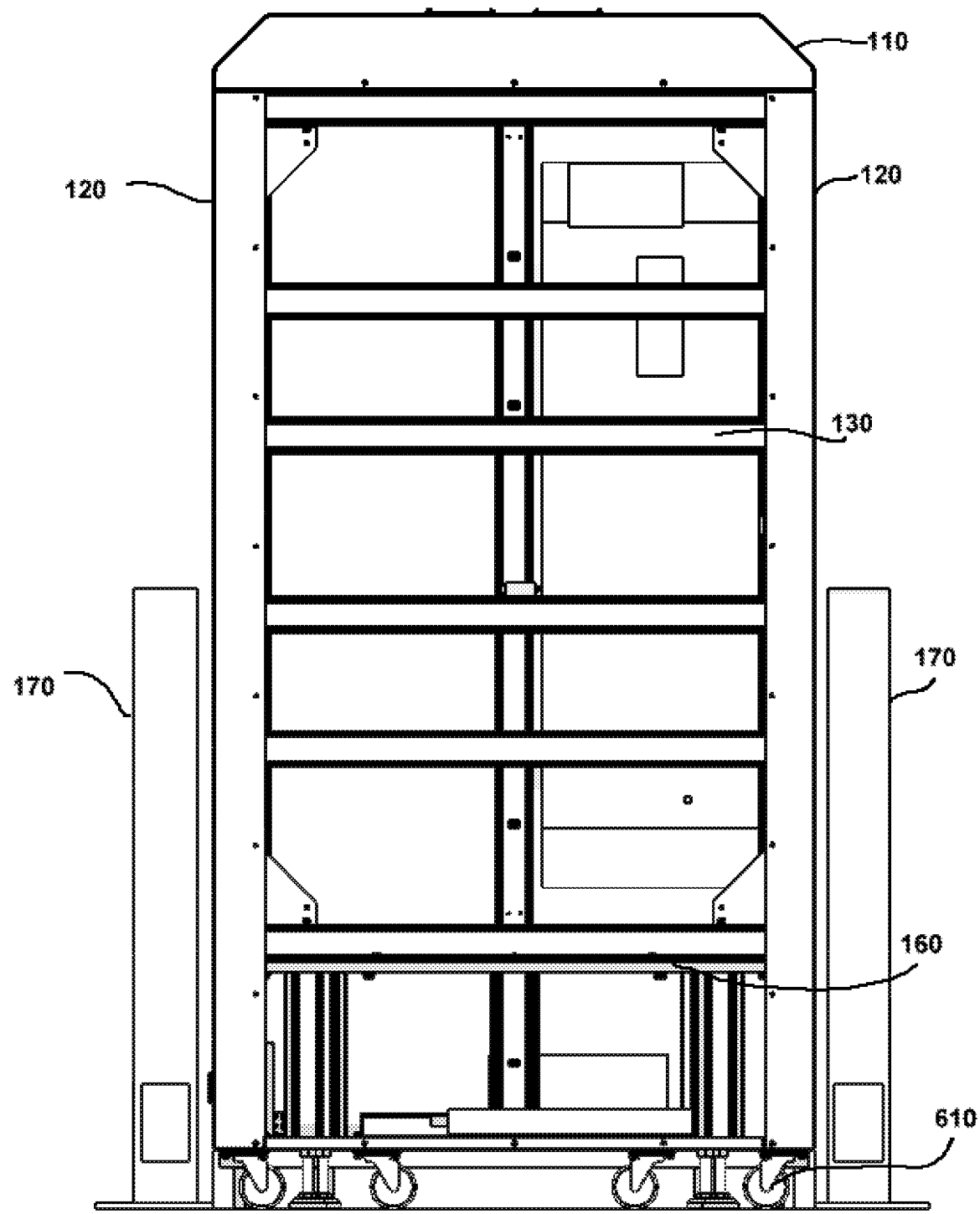
FIG. 6 is a rear view of an alternate display.

FIG. 6 is a rear view of an alternate display. The display shows a cap 110 which is supported by two side rails 120 and connected to a base 140, which includes a base platform 160 at the top of the base 140. The side rails 120 are further support by two stanchions 170. At the rear of the display, the side panels 120 further support the central panel 130. The bottom of the base may have castors 610 mounted thereon to make the hologram display easy to move.

Figure 7:
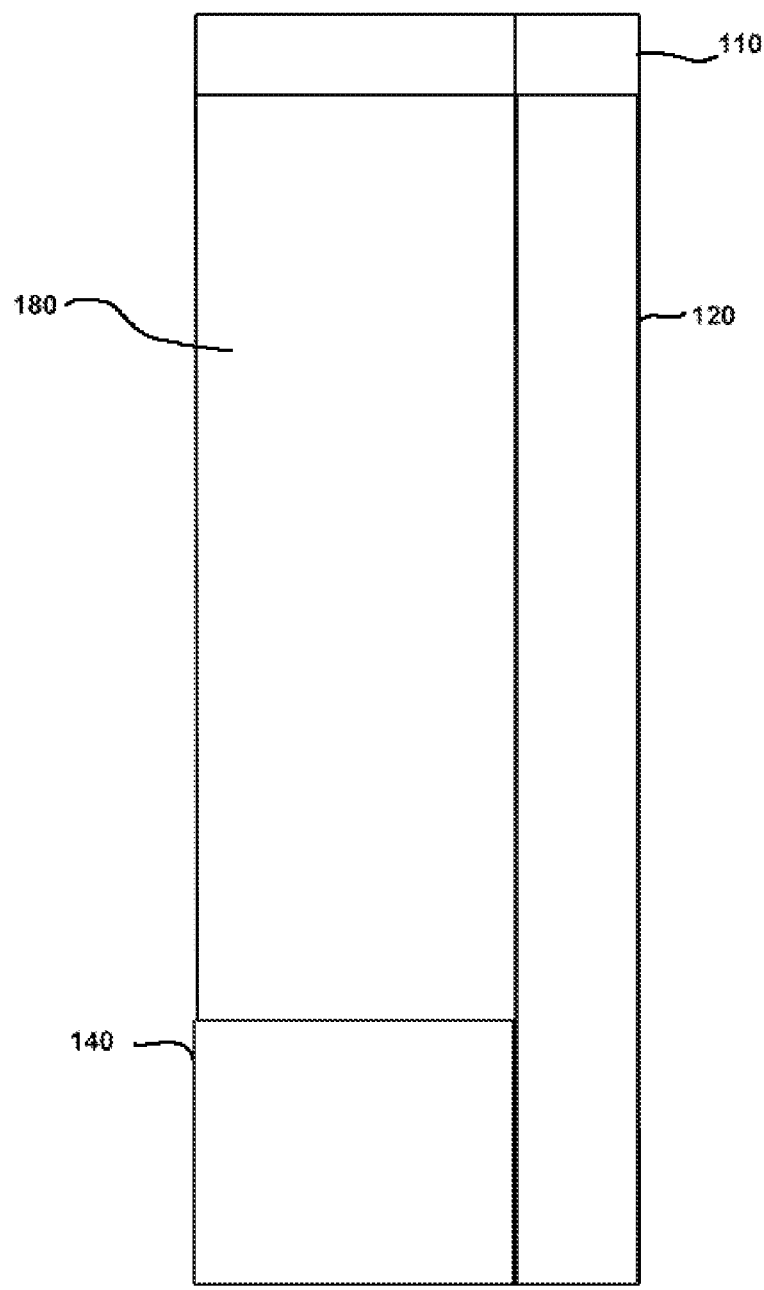

FIG. 7 is a side view of the display. The display shows a cap 110 which is supported by two side rails 120 and connected to a base 140. At the front of the display, the side panels 120, base 140, and cap 100 further support the window 180. The cap 110 is mounted on top of the central panel and side rails 120, and is approximately the same semicircular shape as the base 140. In one embodiment, fans are mounted in the cap and circulate air within the enclosed semicynlindral space circumscribed by the window 180, cap 110, base 140 and central panel. The window 180 encloses the vertical space between the base 140 and the cap 110 and the horizontal space between the side rails 120 supporting the central panel, cicumscribing a semicylindrical space. In an embodiment, the window 180 is made from a formable plastic, plexiglass or film. In an embodiment, the window 180 is form factored with heat. In an embodiment, the window 180 is thin enough to be bent into the semicircular shape. Tint is applied to the window 180 to make it reflective. In an embodiment, the tint is two way. In an embodiment, the tint is 95% dark. In an embodiment, the tint is between 60% and 95% dark. In an embodiment, a clear vinyl wrap is applied to protect the window 108. In an embodiment, a clear automotive clear bra protective coat is applied to protect the window 180.

Figure 8:
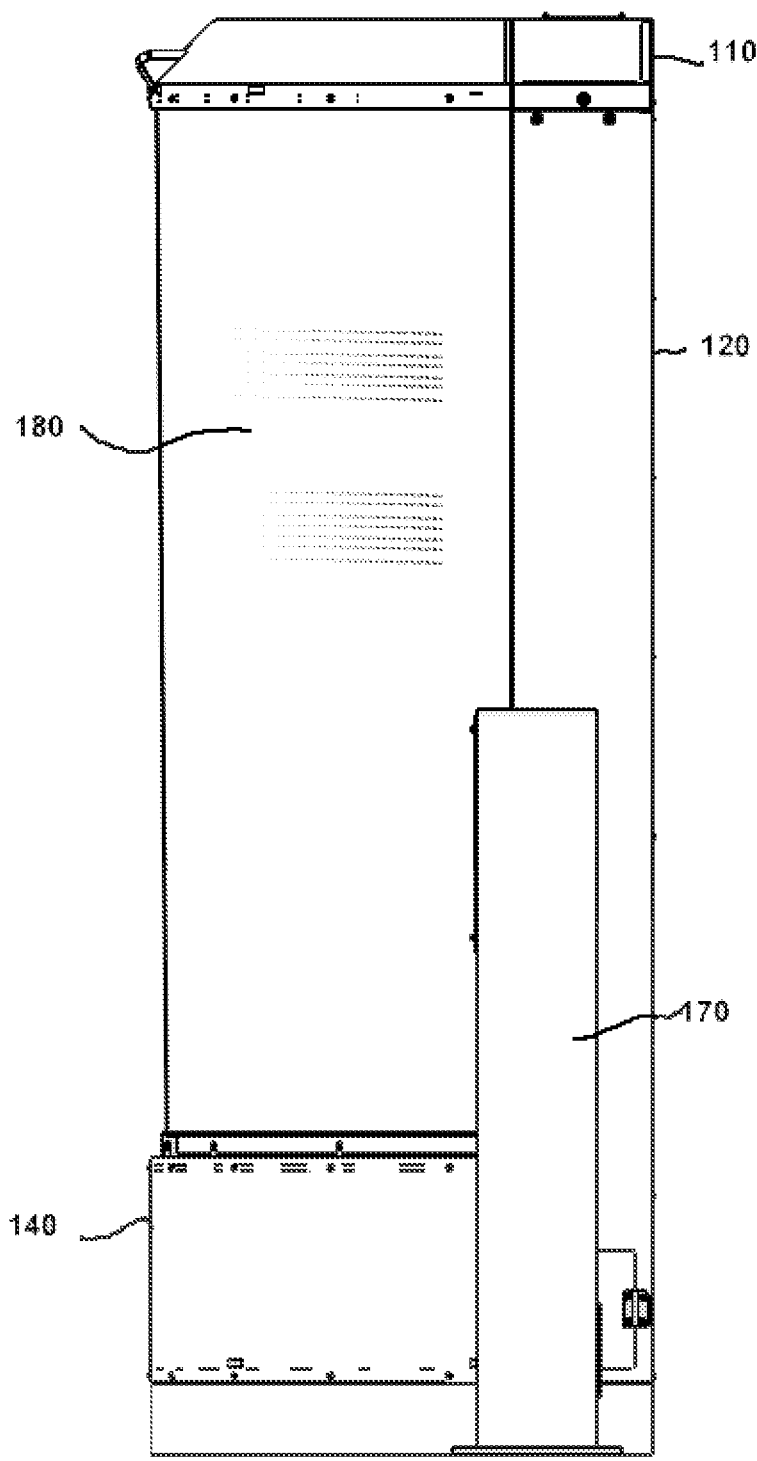
FIG. 8 is a side view of an alternate display.

FIG. 8 is a side view of an alternate display. The display shows a cap 110 which is supported by two side rails 120 and connected to a base 140. The side rails 120 and base 140 are further supported by stanchion 170. At the front of the display, the side panels 120, base 140, and cap 100 further support the window 180. With this configuration, when the base 140 is illuminated with the base lights, the base design shows through the semicircular base cover, and is reflected in the two way mirror film affixed to the display monitor, so the base cover appears to be circular to an observer. When a media image is transmitted to the display monitor through the media input device, that media image is reflected against the tinted window 180 and appears to be floating in the semicylindrial space circumscribed by the window 180, cap 110, base 140 and central panel which appears as a cylindrical space to an observer.

Figure 9:
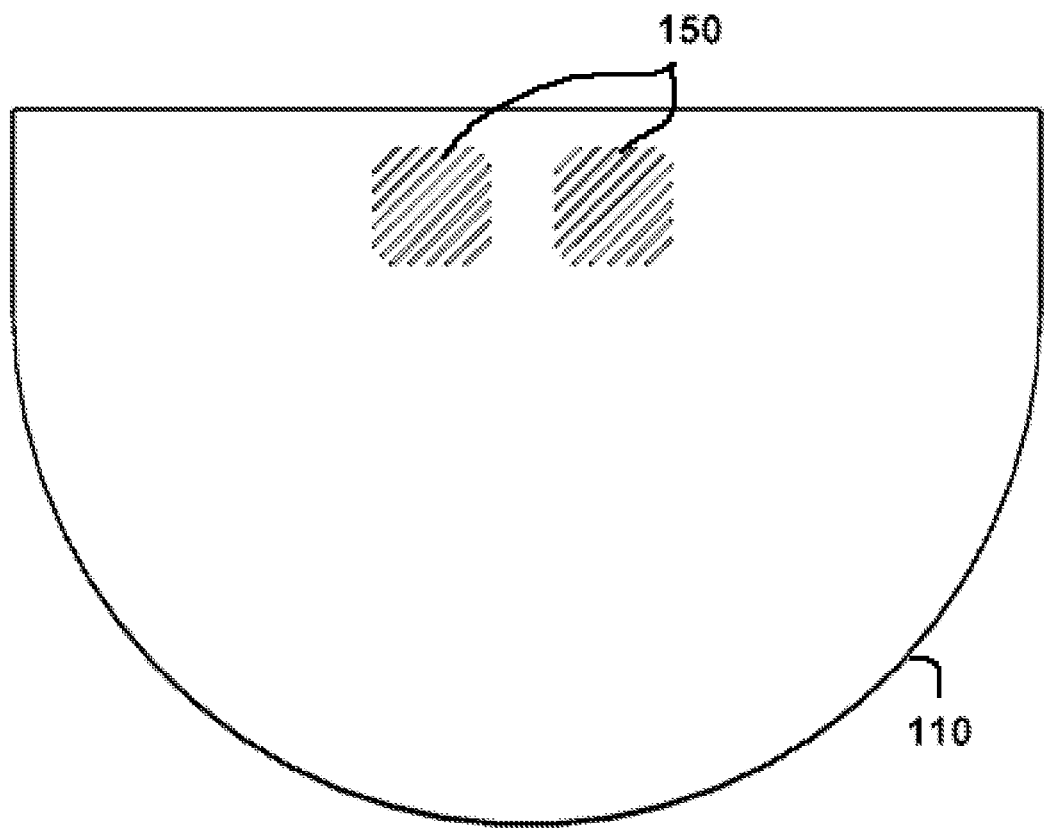
FIG. 9 is a top view of the display.

FIG. 9 is a top view of the display. The display shows a cap 110, and in this embodiment, two fans 150 are shown which provide cooling for the interior of the display.

Figure 10:
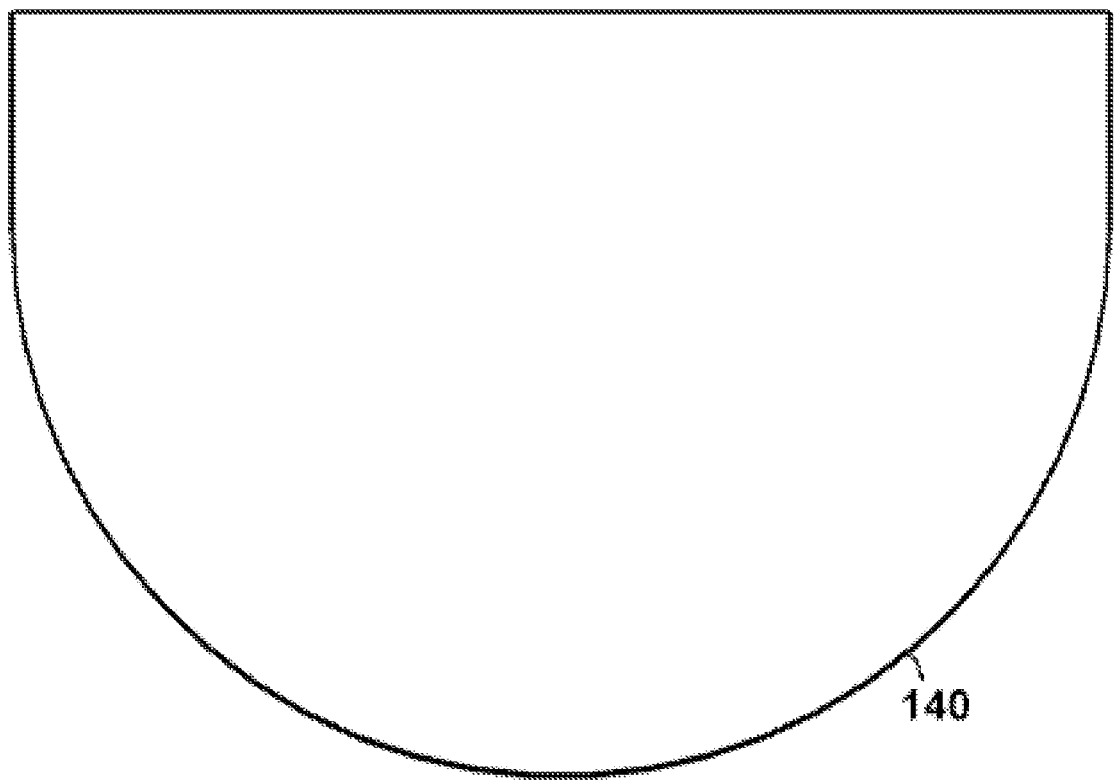
FIG. 10 is a bottom view of the display

FIG. 10 is a bottom view of the display. The display shows a base 140.

Figure 11:
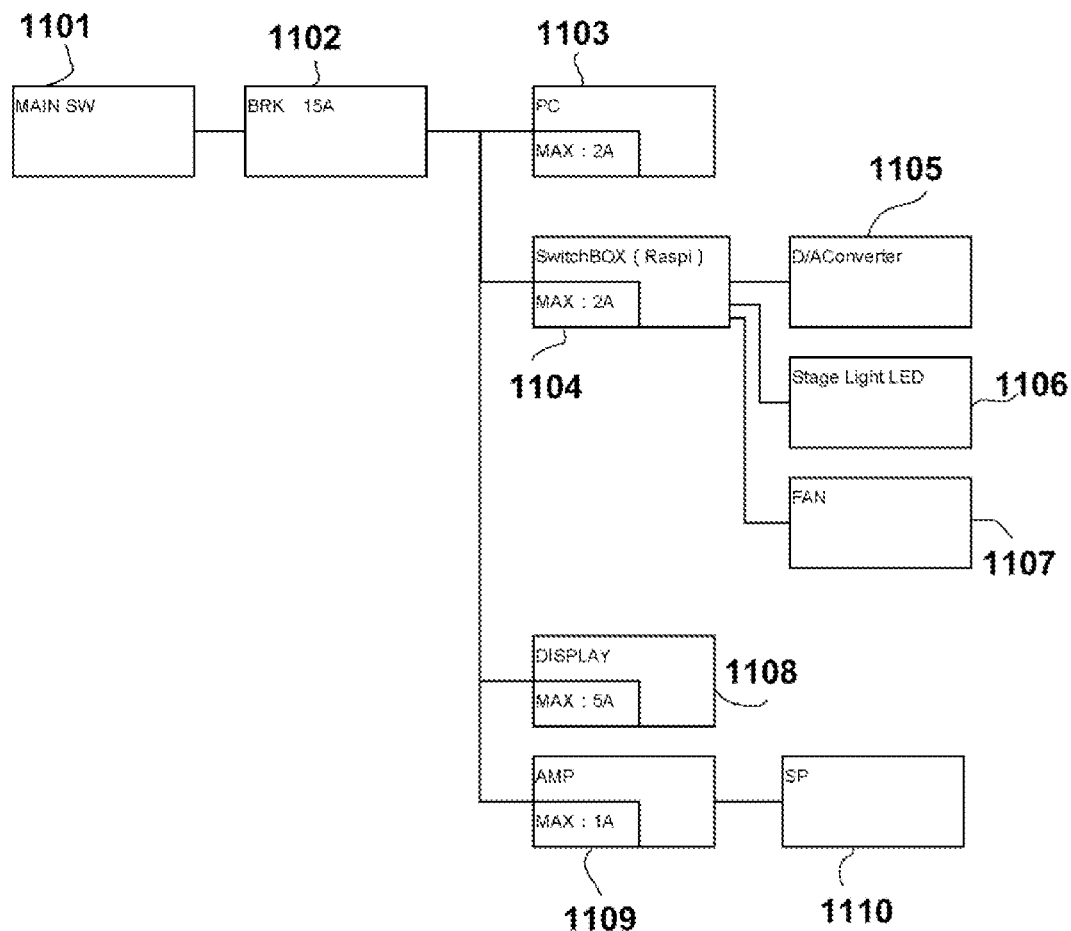
FIG. 11 is a schematic of FIG. 12 is schematic of the signal path.

FIG. 11 is a schematic of power flow through the display projection system. The main switch 1101 is connected to a breaker 1102, which mediates the flow to the computer processing unit 1103, switchbox 1104, display monitor 1108, and amplifier 1109. The switchbox is connected to the digital to analog converter 1105, stage light LED 1106 and fan 1107. The amplifier 1109 is connected to the speakers 1110. In an embodiment, the media input device comprising the computer processing unit 1103 is integrated into the display monitor 1108, and can receive media input through a Wifi connection, blue tooth device, USB drive, or any other method of delivering media input.

Figure 12:
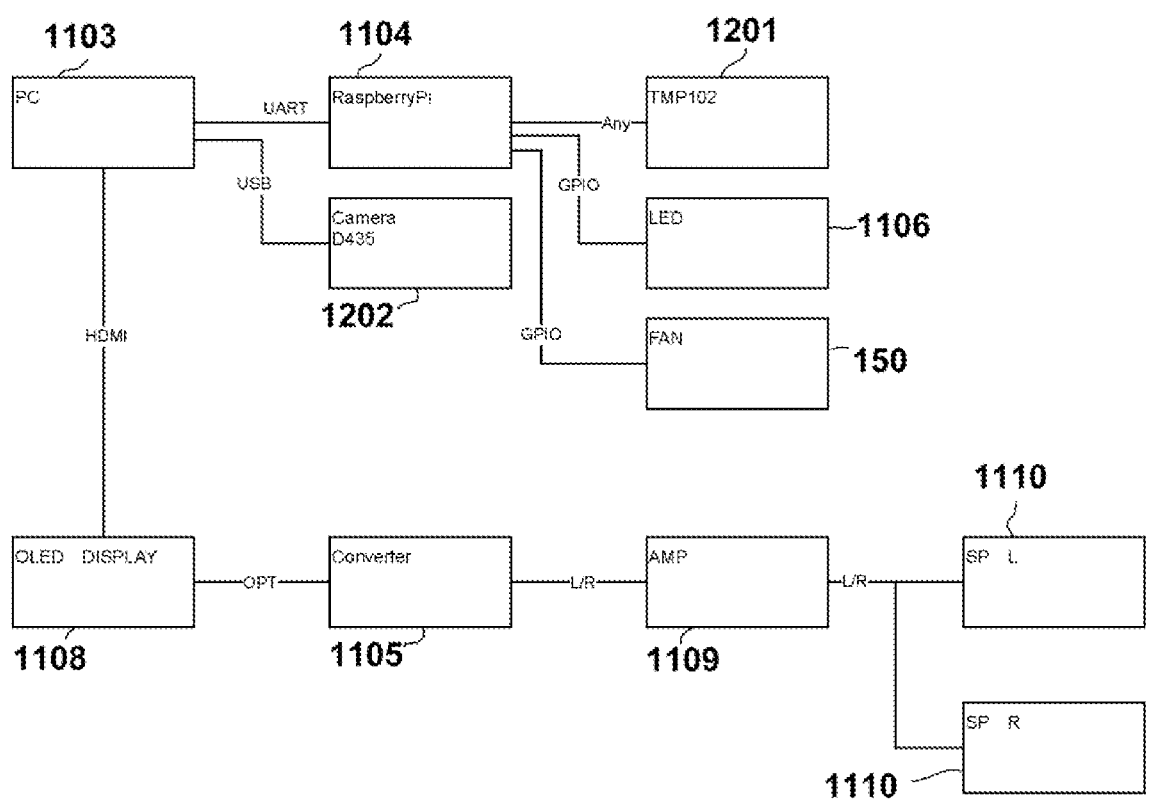

FIG. 12 is schematic of the signal path of the display projection system. The computer processing unit 1103 has a USB connection to a camera 1201. The computer processing unit 1103 has a UART connection to a secondary processing unit or switch box 1104, which in one embodiment of the present invention may be a Raspberry Pi. The computer processing unit has a HDMI connection to a display monitor 1108, which in one embodiment of the present invention is an OLED television monitor. The secondary processing unit has a connection to a temperature sensor 1201. The secondary processing unit 1104 has a GPIO connection to a LED 1106. The secondary processing unit has a GPIO connection to a fan 150. The display monitor has an OPT connection to a digital to analog converter 1105. The digital to analog converter 1105 has an L/R connection to amplifier 1109. Amplifier 1109 has an L/R connection to speakers 1110.

Figure 13:
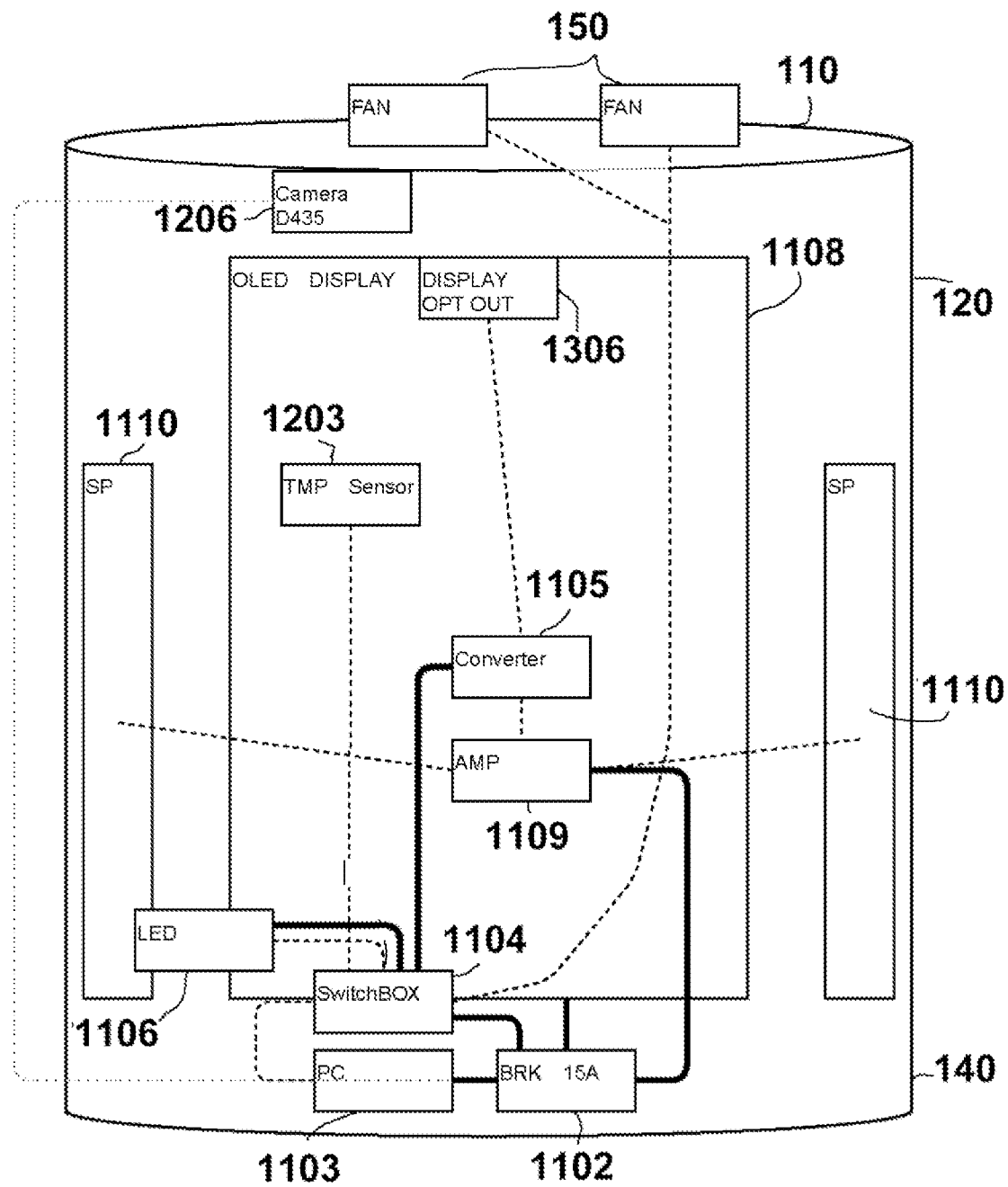
FIG. 13 is a component view.

FIG. 13 is a component view. In one embodiment of the present invention, the display shows a cap 110, supported by side rails 120 attached to a base 140, which comprise a frame that houses internal components for displaying images on the display monitor 1108. The computer processing unit 1103 is connected through breaker 1102 to a secondary processor or switch box 1104. The secondary processing unit has a GPIO connection to a LED 1106. The secondary processing unit has a GPIO connection to a fan 150. The display monitor has an OPT connection 1306 to a digital to analog converter 1105. The digital to analog converter 1105 has an L/R connection to amplifier 1109. Amplifier 1109 has an L/R connection to speakers 1110.

Figure 14:
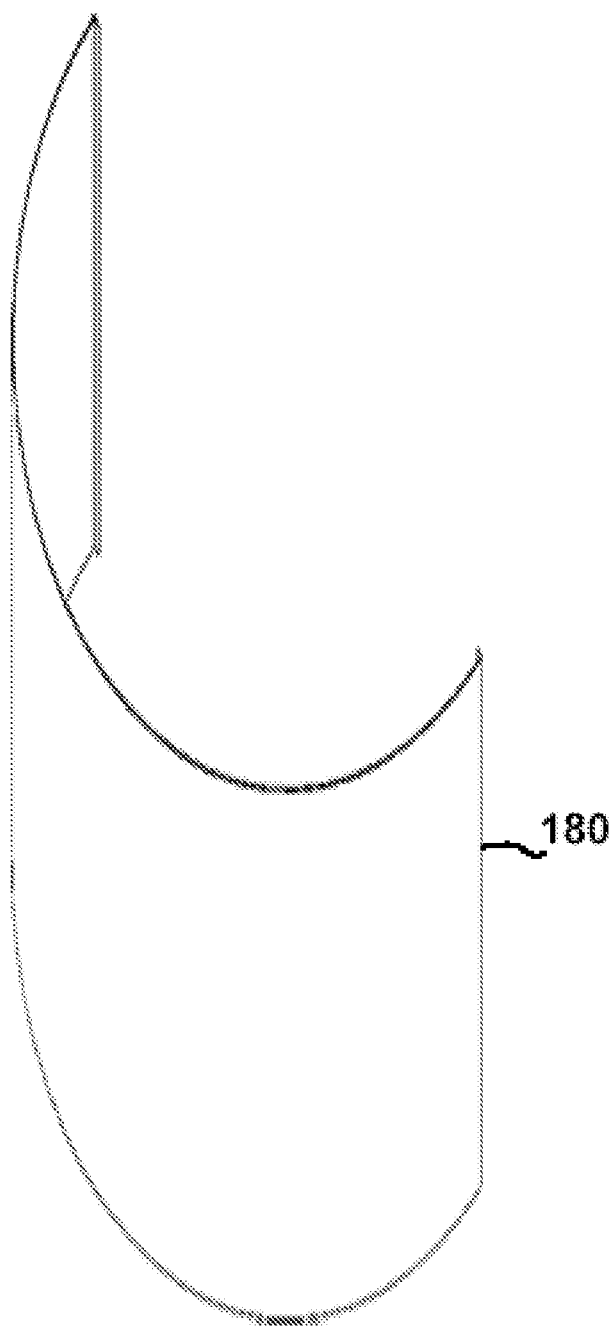
FIG. 14 is an isomorphic view of the window.

FIG. 14 is an isomorphic view of the window 180. The window is semi-circular in shape. In an embodiment, the window 180 is made from a formable plastic, plexiglass or film. In an embodiment, the window 180 is form factored with heat. In an embodiment, the window 180 is thin enough to be bent into the semicircular shape. Tint is applied to the window 180 to make it reflective. In an embodiment, the tint is two way. In an embodiment, the tint is 95% dark. In an embodiment, the tint is between 60% and 95% dark. In an embodiment, a clear vinyl wrap is applied to protect the window 108. In an embodiment, a clear automotive clear bra protective coat is applied to protect the window 180. When a media image is transmitted to the display monitor through the media input device, that media image is reflected against the tinted window 180 and appears to be floating in the semicylindrial space circumscribed by the window 180, cap, base and central panel which appears as a cylindrical space to an observer.

While certain embodiments have been described above, it will be understood that the embodiments described are by way of example only. Accordingly, the systems and methods described herein should not be limited based on the described embodiments. Rather, the systems and methods described herein should only be limited in light of the claims that follow when taken in conjunction with the above description and accompanying drawings.

It should be further understood that the examples and embodiments pertaining to the systems and methods disclosed herein are not meant to limit the possible implementations of the present technology. Further, although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the Claims.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A display for projecting images with the appearance of three dimensions, said display comprising:
    a display housing, wherein said display housing includes
        a window
            wherein said window is a semi-circular shape and tinted dark, and
        wherein said display housing further comprises a cap, a base, a plurality of side rails, and a central panel, and
        wherein said base supports said plurality of said side rails and said central panel, and said plurality of side rails and said central panel support said cap, and
        wherein a display monitor is mounted to said central panel; and
    a display projection system, wherein said display projection system includes the display monitor covered with a two-way mirror film, wherein said display projection system is capable of projecting an image on said window.

2. The display of claim 1, wherein said window is tinted 95% dark, thereby rendering said window reflective.

3. The display of claim 1, wherein said window is tinted between 60% and 95% dark, thereby rendering said window reflective.

4. The display of claim 1, wherein said two-way mirror film is 80% reflective.

5. The display of claim 1, wherein said display projection system further includes a main switch, a computer processing unit, a breaker, a switchbox, an amplifier, a digital to analog converter, a stage light LED, a speaker and a fan,
  wherein said main switch is connected to said breaker, which mediates the electrical flow to said computer processing unit, said switchbox, said display monitor, and said amplifier, and
  wherein said switchbox is connected to said digital to analog converter, said stage light LED and said fan, and wherein said amplifier is connected to said speaker.

6. The display of claim 5, wherein said computer processing unit is integrated into said display monitor.

7. The display of claim 5, wherein said computer processing unit is operable to receive media input through a WiFi connection, Bluetooth connection or a USB connection.

8. The display of claim 5, further comprising temperature sensor and a camera, wherein said computer processing unit has a USB connection to said camera, said computer processing unit has a UART connection to said switch box, said computer processing unit has a HDMI connection to said display monitor, said switchbox has a connection to said temperature sensor, said switchbox has a GPIO connection to said LED, said switchbox has a GPIO connection to said fan, said display monitor has an OPT connection to said digital to analog converter, said digital to analog converter has an L/R connection to said amplifier, and said amplifier has an L/R connection to said speaker.

* * * * *